United States Patent
Lee et al.

(10) Patent No.: US 7,596,182 B1
(45) Date of Patent: Sep. 29, 2009

(54) OPTIMUM SYMBOL TIMING ESTIMATION WITH VARIOUS PERFORMANCE MEASURES FOR OFDM SYSTEMS

(75) Inventors: Jungwon Lee, Stanford, CA (US); Dimitrios-Alexandros Toumpakaris, Sunnyvale, CA (US); Hui-Ling Lou, Palo Alto, CA (US)

(73) Assignee: Marvell International, Ltd., Hamilton (BM)

( * ) Notice: Subject to any disclaimer, the term of this patent is extended or adjusted under 35 U.S.C. 154(b) by 880 days.

(21) Appl. No.: 11/002,786

(22) Filed: Dec. 1, 2004

Related U.S. Application Data

(60) Provisional application No. 60/600,876, filed on Aug. 11, 2004.

(51) Int. Cl.
*H04L 5/12* (2006.01)
*H04L 27/06* (2006.01)
*H03M 13/03* (2006.01)

(52) U.S. Cl. .................. 375/262; 375/341; 714/794; 714/795

(58) Field of Classification Search .......... 375/144, 375/148, 260, 262, 265, 340, 341, 354; 370/208, 370/210, 503; 714/775, 776, 794, 795
See application file for complete search history.

(56) References Cited

U.S. PATENT DOCUMENTS

| | | | |
|---|---|---|---|
| 5,574,747 A * | 11/1996 | Lomp | 375/144 |
| 6,526,104 B1 * | 2/2003 | Hutchins et al. | 375/341 |
| 6,922,388 B1 | 7/2005 | Laroia et al. | |
| 2004/0190638 A1 | 9/2004 | Claret et al. | |
| 2005/0008103 A1 * | 1/2005 | Sternberg et al. | 375/340 |
| 2006/0018413 A1 | 1/2006 | Gupta | |

OTHER PUBLICATIONS

"Information technology—Telecommunications and information exchange between systems—Local and metropolitan area networks—Specific requirements- Part 11: Wireless LAN Medium Access Control (MAC) and Physical Layer (PHY) specifications", ANSI/IEEE Std 802.11, 1999.

"Part 11: Wireless LAN Medium Access Control (MAC) and Physical Layer (PHY) specifications: Higher-Speed Physical Layer Extension in the 5 GHz Band", IEEE Std 802.11a-1999.

"Part 11: Wireless LAN Medium Access Control (MAC) and Physical Layer (PHY) specifications: Higher-Speed Physical Layer Extension in the 2.4 GHz Band", IEEE Std 802.11b-1999.

"Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band", IEEE 802.11g/D8.2, Apr. 2003.

(Continued)

*Primary Examiner*—Young T. Tse

(57) ABSTRACT

A receiver in an OFDM system may include a multi-mode estimator to estimate symbol timing offset for different performance measures. In addition to a maximum likelihood estimation mode, the estimator may have a minimum failure probability estimation mode, a minimum mean square error estimation mode, and a minimum modified mean square error estimation mode.

75 Claims, 10 Drawing Sheets

OTHER PUBLICATIONS

John A.C. Bingham, "Multicarrier Modulation for Data Transmission: An Idea Whose Time Has Come", IEEE Communications Magazine, pp. 5-14, May 1990.

Helmut Bolcskei, "Blind Estimation of Symbol Timing and Carrier Frequency Offset in Wireless OFDM Systems", IEEE Transactions on Communications, vol. 49, No. 6, pp. 988-999, Jun. 2001.

Lashkarian et al., "Class of Cyclic-Based Estimators for Frequency-offset Estimation of OFDM Systems", IEEE Transactions on Communications, vol. 48, No. 12, pp. 2139-2149, Dec. 2000.

Lee et al., "Maximum likelihood estimation of time and frequency offset for OFDM systems", Electronics Letters, pp. 1-11.

Jia-Chin Lin, "Maximum-Likelihood Frame Timing Instant and Frequency Offset Estimation for OFDM Communication Over a Fast Rayleigh-Fading Channel", IEEE Transactions on Vehicular Technology, vol. 52, No. 4, pp. 1049-1062, Jul. 2003.

Negi et al., "Blind OFDM Symbol Synchronization in ISI Channels", IEEE Transactions on Communications, vol. 50, No. 9, pp. 1525-1534, Sep. 2002.

Schmidl et al., "Robust Frequency and Timing Synchronization for OFDM", IEEE Transactions on Communications, vol. 45, No. 12, pp. 1613-1621, Dec. 1997.

Speth et al., "Frame synchronization of OFDM systems in frequency selective fading channels", IEEE, pp. 1807-1811, Mar. 1997.

van de Beck et al., "ML Estimation of Time and Frequency Offset in OFDM Systems", IEEE Transactions on Signal Processing, vol. 45, No. 7, pp. 1800-1805, Jul. 1997.

Yang et al., "Timing Recovery for OFDM Transmission", IEEE Journal on Selected Areas in Communications, vol. 18, No. 11, pp. 2278-2291, Nov. 2000.

Nee et al., "OFDM for Wireless Multimedia Communications", pp. 33-51, Norwell, MA: Artech House, 2000.

A. Leon-Garica, Probability and Random Processes for Electrical Engineering, pp. 210-217, $2^{nd}$ ed. New York: Addison-Wesley, 1994.

"TGn Sync Proposal Technical Specification", IEEE 802.11n-04/0889r6, May 2005.

\* cited by examiner

OPTIMUM SYMBOL TIMING ESTIMATION WITH VARIOUS PERFORMANCE MEASURES FOR OFDM SYSTEMS

CROSS-REFERENCE TO RELATED APPLICATIONS

This application claims priority to U.S. Provisional Application Ser. No. 60/600,876, filed on Aug. 11, 2004, the contents of which are incorporated herein by reference.

BACKGROUND

Wireless systems may use an Orthogonal Frequency Division Multiplexing (OFDM) transmission scheme. In an OFDM system, a data stream is split into multiple substreams, each of which is sent over a subcarrier frequency. Because data is carried over multiple carrier frequencies, OFDM systems are referred to as "multicarrier" systems as opposed to single carrier systems in which data is transmitted on one carrier frequency.

An advantage of OFDM systems over single carrier systems is their ability to efficiently transmit data over frequency selective channels by employing a fast Fourier transform (FFT) algorithm instead of the complex equalizers typically used by single carrier receivers. This feature enables OFDM receivers to use a relatively simple channel equalization method, which is essentially a one-tap multiplier for each tone.

Despite these advantages, OFDM systems may be more sensitive to symbol timing offset than single carrier systems. Various symbol synchronization algorithms have been developed for OFDM systems, of which some require transmission of pilot symbols, whereas others are blind. Although the algorithms based on pilot symbols can achieve synchronization relatively fast and accurately, the insertion of the pilot symbols may decrease the data rate.

SUMMARY

A receiver in an OFDM system may include a multi-mode estimator to estimate symbol timing offset for different performance measures. The multi-mode estimator may select from multiple available symbol timing estimation modes based on a selected performance measure. The estimator may receive time-domain samples belonging to two or more OFDM symbols and use these samples to estimate a symbol timing offset in the selected timing estimation mode.

The estimator may select a maximum likelihood (ML) mode when the selected performance measure corresponds to maximizing a probability that the estimated symbol timing offset is equal to a true symbol timing offset.

The estimator may select a minimum failure probability (MFP) estimation mode when the selected performance measure corresponds to maximizing a probability that a beginning of a fast Fourier transfer window in the symbol lies inside a region formed by cyclic prefix samples in the symbol and a first useful sample in the symbol. In this mode the estimator may calculate the symbol timing estimate by solving the following equation:

$$\hat{\theta} = \arg\max_{0 \le \theta \le N_t - 1} \left\{ \sum_{k=\theta}^{\theta+N_g} e^{\beta[\text{Re}\{\gamma(k)\} - \rho\Phi(k)] - \Psi(k)} \right\},$$

where $\hat{\theta}$ is the symbol timing offset estimate,
$N_t$ is the total number of samples in the symbol,
$N_g$ is the number of samples in the cyclic prefix, $N = N_t - N_g$, $$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\gamma(k) = \sum_{n \in A_k \cap I} y[n] y^*[n + N],$$

$$\Phi(k) = \frac{1}{2} \sum_{n \in A_k \cap I} (|y[n]|^2 + |y[n+N]|^2),$$

$$\Psi(k) = |A_k \cap I| \log(1 - \rho^2),$$

$I = \{0, 1, \ldots, M-N-1\}$, $\sigma_X^2$ is the power of the transmit signal,
$\sigma_Z^2$ is the power of the noise, and
M is the size of an observation window.

The estimator may select a minimum mean square error (MMSE) estimation mode when the selected performance measure corresponds to minimizing a mean square error of the symbol timing estimate. In this mode the estimator may calculate the symbol timing estimate by solving the following equation:

$$\hat{\theta} = \underset{0 \le k \le N_t}{\arg\min} \left\{ \sum_{\theta=0}^{N_t-1} c(k-\theta) e^{\beta[\text{Re}\{\gamma(\theta)\} - \rho\Phi(\theta)] - \Psi(\theta)} \right\},$$

with an error function $c(\epsilon) = [\min\{((\epsilon))_{N_t}, N_t - ((\epsilon))_{N_t}\}]^2$, and
where $\hat{\theta}$ is the symbol timing offset estimate,
$N_t$ is the total number of samples in the symbol,
$N_g$ is the number of samples in the cyclic prefix, $N = N_t - N_g$, $$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\Phi(\theta) = \frac{1}{2} \sum_{n \in A_\theta \cap I} (|y[n]|^2 + |y[n+N]|^2),$$

$$\Phi(\theta) = \frac{1}{2} \sum_{A_\theta \cap I} (|y[n]|^2 + |y[n+N]|^2),$$

$$\Psi(\theta) = |A_\theta \cap I| \log(1-\rho^2),$$

$I = \{0, 1, \ldots, M-N-1\}$, $\sigma_X^2$ is the power of the transmit signal,
$\sigma_Z^2$ is the power of the noise, and
M is the size of an observation window.

The estimator may select a minimum modified mean square error (MMMSE) estimation mode when the selected performance measure corresponds to minimizing a mean square of a modified error of the symbol timing offset estimate, where the modified error is a distance between a beginning of an fast Fourier transform window in the symbol and a cyclic prefix in the symbol. In this mode the estimator may calculate the symbol timing estimate by solving the following equation:

$$\hat{\theta} = \underset{0 \le k \le N_t}{\mathrm{argmin}} \left\{ \sum_{\theta=0}^{N_t-1} c(k-\theta) e^{\beta[\mathrm{Re}\{\gamma(\theta)\} - \rho \Phi(\theta)] - \Psi(\theta)} \right\},$$

with an error function $c(\epsilon) = [\max\{\min\{((\epsilon))_{N_1}, N-((\epsilon))_{N_1}\}, 0\}]^2$, and
  where $\hat{\theta}$ is the symbol timing offset estimate,
  $N_t$ is the total number of samples in the symbol,
  $N_g$ is the number of samples in the cyclic prefix, $N = N_t - N_g$, $$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n] y^*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$I = \{0, 1, \ldots, M-N-1\}$, $\sigma_X^2$ is the power of the transmit signal,
$\sigma_Z^2$ is the power of the noise, and
M is the size of an observation window.

For the general case of a given cost function, the estimator may minimize the average cost by solving the equation:

$$\hat{\theta} = \underset{0 \le k \le N_t}{\mathrm{argmin}} \left\{ \sum_{\theta=0}^{N_t-1} c(k-\theta) e^{\beta[\mathrm{Re}\{\gamma(\theta)\} - \rho \Phi(\theta)] - \Psi(\theta)} \right\},$$

with an error function $c(\epsilon) = [\min\{((\epsilon))_{N_1}, N_t-((\epsilon))_{N_t}\}]^2$, and
  where $\hat{\theta}$ is the symbol timing offset estimate,
  $N_t$ is the total number of samples in the symbol,
  $N_g$ is the number of samples in the cyclic prefix, $N = N_t - N_g$, $$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n] y^*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$I = \{0, 1, \ldots, M-N-1\}$, $\sigma_X^2$ is the power of the transmit signal,
$\sigma_Z^2$ is the power of the noise, and
M is the size of an observation window.

DETAILED DESCRIPTION

Figure 1:
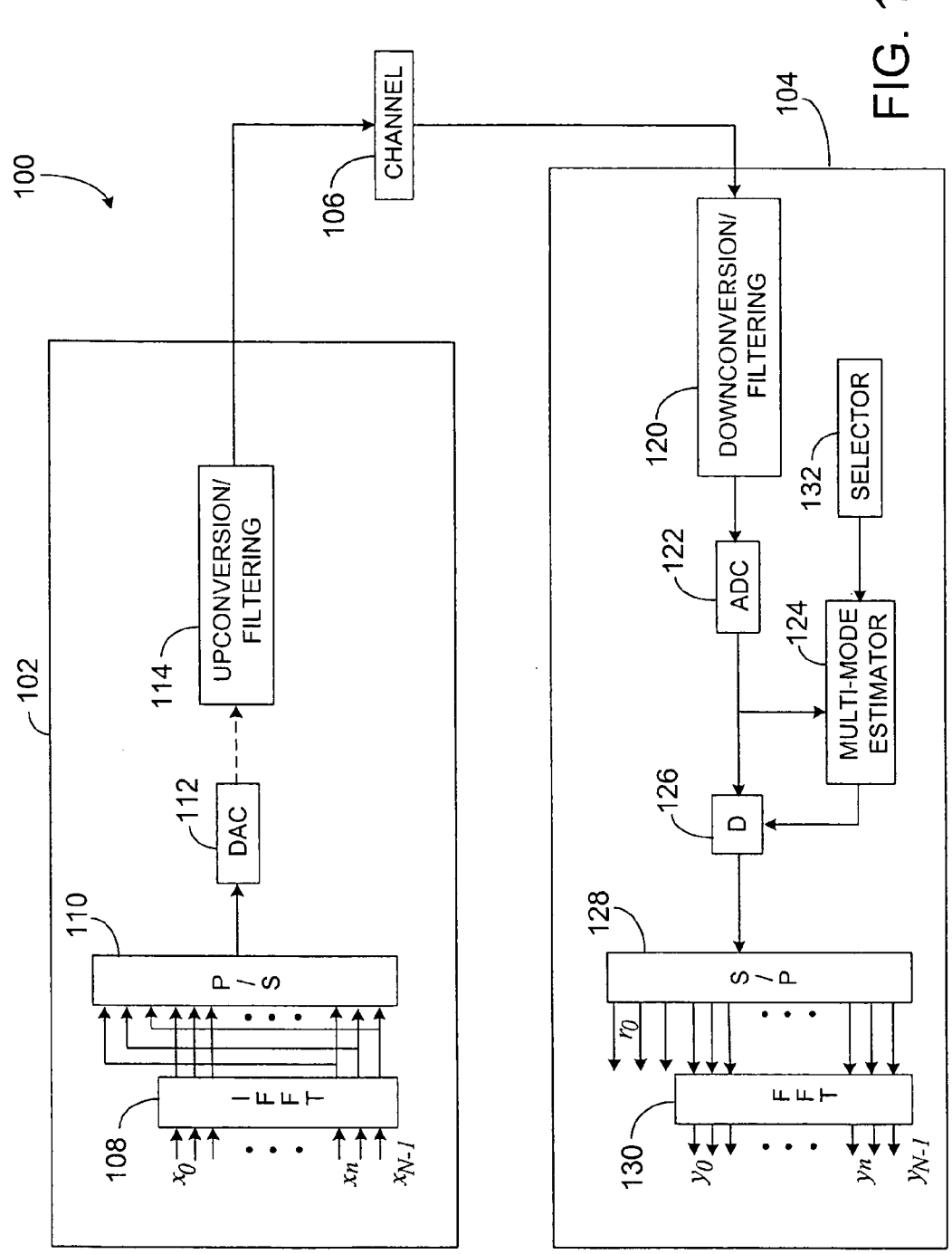
FIG. 1 is a block diagram of a wireless system according to an embodiment.

FIG. 1 shows a wireless communication system 100 according to an embodiment. The wireless communication system includes a transmitter 102 and a receiver 104 that communicate over a wireless channel 106. The transmitter 102 and receiver 104 may be implemented in two different transceivers, each transceiver including both a transmitter section and a receiver section.

The wireless communication system 100 may be implemented in a wireless local area network (WLAN) that complies with the IEEE 802.11 standards (including IEEE 802.11, 802.11a, 802.11b, 802.11g, and 802.11n). The IEEE 802.11 standards describe OFDM systems and the protocols used by such systems. In an OFDM system, a data stream is split into multiple substreams, each of which is sent over a different subcarrier frequency (also referred to as a "tone"). For example, in IEEE 802.11a systems, OFDM symbols include 64 tones (with 48 active data tones) indexed as $\{-32, -31, \ldots, -1, 0, 1, \ldots, 30, 31\}$, where 0 is the DC tone index. The DC tone is not used to transmit information.

Figure 2:
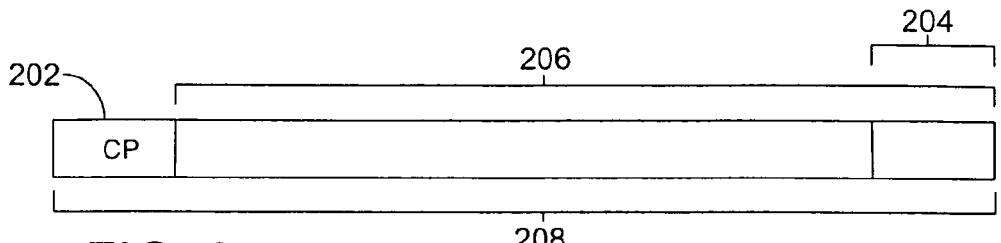
FIG. 2 illustrates an OFDM symbol structure.

At the transmitter 102, N complex data symbols are transformed into time-domain samples by an inverse fast Fourier transform (IFFT) module 108. A cyclic prefix may be added to the body of the OFDM symbol to avoid interference (ISI) and preserve orthogonality between subcarriers. The cyclic prefix 202 may include copies of the last $N_g$ samples 204 of the N time-domain samples 206, as shown in FIG. 2. The cyclic prefix is appended as a preamble to the N time-domain samples to form the complete OFDM symbol 208 with $N_t = N_g + N$ samples.

The OFDM symbols are converted to a single data stream by a parallel-to-serial (P/S) converter 110 and concatenated serially. The discrete symbols are converted to analog signals by a digital-to-analog converter (DAC) 112 and lowpass filtered for radio frequency (RF) upconversion by an RF module 114. The OFDM symbols are transmitted over the wireless channel 106 to the receiver 104, which performs the inverse process of the transmitter 102.

At the receiver 104, the received signals are down converted and filtered by an RF module 120 and converted to a digital data stream by an analog-to-digital converter (ADC) 122.

For proper operation, the receiver 104 should be able to determine the correct position of the FFT window, i.e., the N useful data samples 206 in the OFDM symbol 208. When the beginning of the FFT window is placed inside the cyclic prefix region, a change in phase proportional to the subcarrier index will appear at the FFT output. When the beginning of the FFT window is placed after the first useful sample, the signal to noise ratio (SNR) will also be reduced in addition to the phase change.

A multi-mode estimator 124 may be used for symbol timing estimation. The estimator 124 may observe a window of samples of the received OFDM symbols to estimate the time offset θ. The estimated time offset $\hat{\theta}$ may be fed to an FFT window alignment module 126 to enable the alignment module to determine the boundary of the OFDM symbols for proper FFT demodulation. The part of the OFDM symbol that is outside the FFT window is discarded, whereas the remaining N samples are converted into parallel substreams by a serial-to-parallel (S/P) converter 128 and sent to an FFT module 130 that outputs the data in N tones.

The multi-mode estimator 124 may use different algorithms in different estimation modes to estimate the symbol timing offset. These modes may include a maximum likelihood (ML) estimation mode, a minimum failure probability (MFP) estimation mode, a minimum mean square error (MMSE) estimation mode, and a minimum modified mean square error (MMMSE) estimation mode, which are described in more detail below.

A selector 132 may select one of these modes based on the objectives of the timing synchronization. For example, the ML estimation algorithm is a widely used blind symbol synchronization algorithm. While the ML estimation algorithm mode may be optimal in the sense that it maximizes the probability that the symbol timing estimation error is zero, the ML estimation algorithm does not guarantee that the error will be small when the estimate is incorrect. When maintaining small error magnitude is critical, the MMSE estimation mode may be utilized to minimize the mean square error. In other scenarios, the estimation error may need to be defined as the distance of the starting point of the FFT window to the region consisting of the cyclic prefix samples and the first useful data sample. With this modified definition of the estimation error, one of the MFP and MMMSE estimation modes may be more appropriate.

Figure 3:
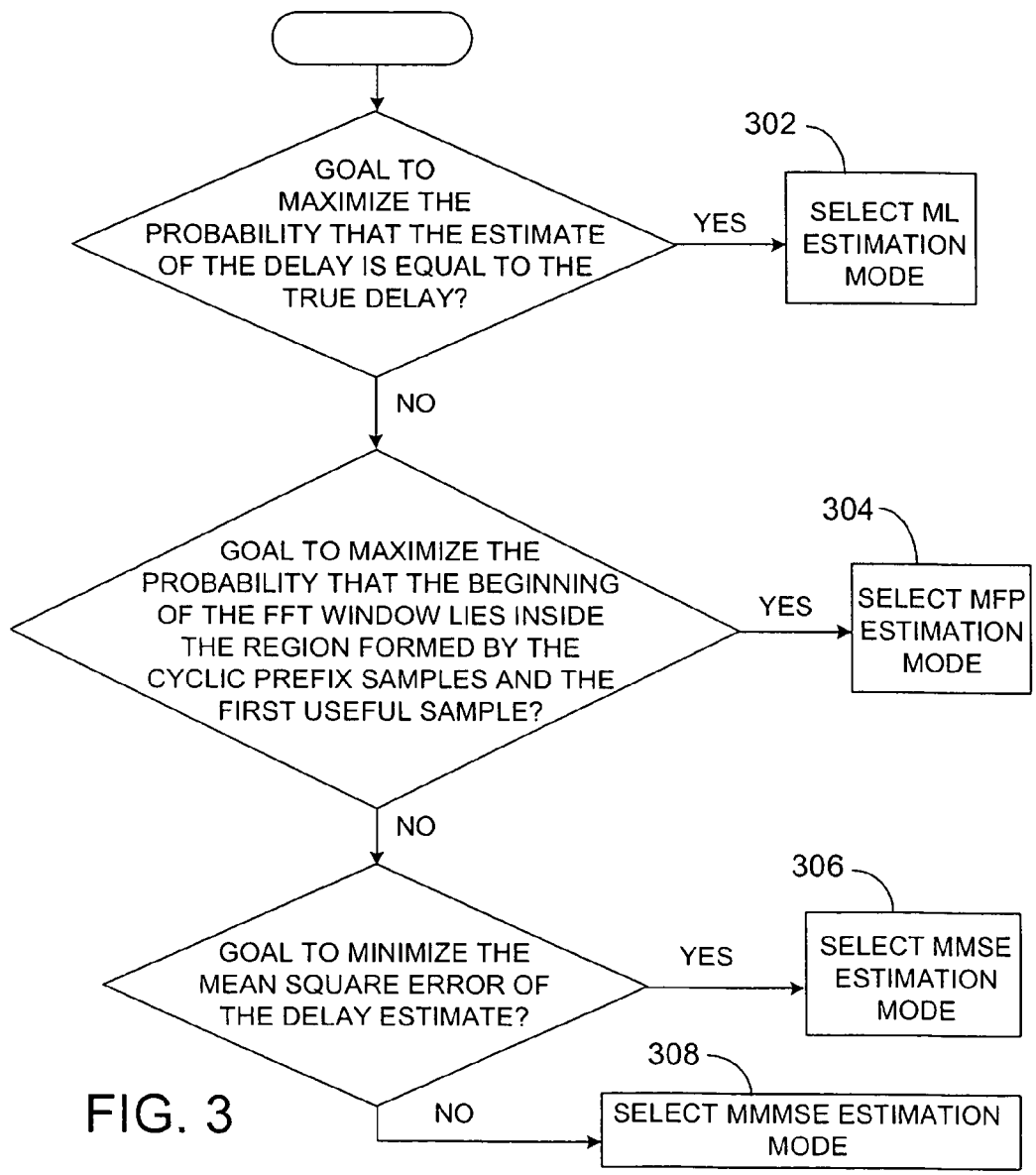
FIG. 3 is a flowchart describing an estimation mode selection operation according to an embodiment.

As shown in FIG. 3, the selector 132 may select the ML estimation mode (block 302) when the goal of the timing synchronization is to maximize the probability that the estimate $\hat{\theta}$ of the time delay is equal to the true delay θ. The selector may select the MFP estimation mode (block 304) when the goal of the timing synchronization is to maximize the probability that the beginning of the FFT window lies inside the region formed by the cyclic prefix samples and the first useful sample. The selector may select the MMSE estimation mode (block 306) when the goal of the timing synchronization is to minimize the mean square error of the delay estimate. The selector may select the MMMSE estimation mode (block 308) when the goal of the timing synchronization is to minimize the mean square of the modified error, where the modified error is defined as the distance between the beginning of the FFT window and the cyclic prefix. The various estimation algorithms are derived below.

OFDM symbols are concatenated serially to generate the time-domain transmit signal X[n], where a capital letter is used to emphasize the fact that the transmit signal is a random process. With the assumption that the channel introduces an unknown time delay and deteriorates the transmit signal with additive white Gaussian noise (AWGN), the received time domain signal Y[n] can be expressed as $$Y[n]=X[n-\Theta]+Z[n] \qquad (1)$$

where $\Theta$ represents the unknown delay and Z[n] is a white Gaussian noise random process independent of X[n].

When the data symbols in the different subcarriers are independent and identically distributed and N is large, the received time-domain signal can be modeled as a complex Gaussian random process with autocorrelation $$E[Y[n]Y^*[n+m]] = \begin{cases} (\sigma_X^2 + \sigma_Z^2)\delta[m] + \sigma_X^2\delta[m-N], & m \in A_\theta \\ (\sigma_X^2 + \sigma_Z^2)\delta[m] + \sigma_X^2\delta[m+N], & m \in A_{\theta+N} \\ (\sigma_X^2 + \sigma_Z^2)\delta[m], & \text{otherwise} \end{cases} \qquad (2)$$

where $$\delta[m] = \begin{cases} 1, & m=0 \\ 0, & \text{otherwise} \end{cases}, \qquad (3)$$

$$A_k = \bigcup_{i=-\infty}^{\infty} \{k+iN_t, \ldots, (k+N_g-1)+iN_t\}, \qquad (4)$$

and $\sigma_X^2$ and $\sigma_Z^2$ are the power of the transmit signal and noise, respectively. From the definition of $A_k$, it can be seen that the index set $A_\Theta$ contains the indices of the cyclic prefix samples.

For an observation window of size M with a random vector of observations Y=[Y[0] . . . Y[M−1]], the objective of the timing synchronization problem can be expressed as finding an estimation mode estimate $\hat{\theta}$ of the delay $\Theta$ given the observation Y.

Maximum Likelihood Estimation

When the objective of the timing synchronization is to maximize the probability that the estimate $\hat{\theta}$ of the delay is equal to the true delay $\theta$, the estimation mode that maximizes $P[\hat{\Theta}=\Theta]$ should be selected. Since $P[\hat{\Theta}=\Theta]=E_Y[P[\hat{\Theta}=\Theta|Y]]$, the estimate of $\Theta$ given Y=y should be $$\hat{\theta} = \arg\max_\theta \{p_{\Theta|Y}(\theta|y)\}, \qquad (5)$$

in order to maximize $P[\hat{\Theta}=\Theta]$, where $p_{\Theta|Y}(\theta|y)$ is the conditional probability mass function (pmf) of $\Theta$ given Y=y. The estimate (5) is called the maximum a posteriori (MAP) estimate. Using Bayes rule, $$p_{\Theta|Y}(\theta|y) = \frac{f_{Y|\Theta}(y|\theta)p_\Theta(\theta)}{f_Y(y)}, \qquad (6)$$

where $f_{Y|\Theta}(y|\theta)$ is the conditional probability density function (pdf) of Y given $\Theta=\theta$, and $f_Y(y)$ is the pdf of Y. Assuming that the receiver does not have any information about the delay $\Theta$, the probability mass function of $\Theta$ is $$p_\Theta = \begin{cases} \frac{1}{N_t}, & 0 \le \theta \le N_t - 1 \\ 0, & \text{otherwise.} \end{cases} \qquad (7)$$

When the receiver has a priori information about the delay, the pmf that corresponds to the information should be used. For the uniform pmf, the MAP estimate is simplified to the ML estimate:

$$\hat{\theta} = \arg\max_\theta \{f_{Y|\Theta}(y|\theta)\}, \qquad (8)$$

The conditional pdf $f_{Y|\Theta}(y|\theta)$ can be expressed as follows:

$$f_{Y|\Theta}(y|\theta) = \alpha e^{\beta\{Re\{\gamma(\theta)\}-\rho\Phi(\theta)\}-\Psi(\theta)}, \qquad (9)$$

where $$\beta = \frac{2\rho}{(\sigma_X^2+\sigma_Z^2)(1-\rho^2)}, \qquad (10)$$

$$\rho = \frac{\sigma_X^2}{(\sigma_X^2+\sigma_Z^2)} \qquad (11)$$

$$\gamma(\theta) = \sum_{n \in A_\theta \cap I} y[n]y*[n+N], \qquad (12)$$

where $y*[n+N]$ is the complex conjugate of y[n+N], where y[n] is a received sample with index n, $$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2), \qquad (14)$$

where $|A_\theta \cap I|$ is the cardinality of $A_\theta \cap I$, $$I = \{0, 1, \ldots, M-N-1\}, \text{ and} \qquad (15)$$

where $\alpha$ is a constant that does not depend on $\theta$, and $A_\Theta$ is defined in (4).

Since the exponential function $e^x$ is a monotonically increasing function of x, the ML estimate of $\Theta$ given Y=y can be calculated by using $$\hat{\theta} = \arg\max_{0 \le \theta \le N_t - 1} \{\beta[\{Re\{\gamma(\theta)\} - \rho\Phi(\theta)] - \Psi(\theta)\}. \qquad (16)$$

When the observation window size M is $nN_t+N$ for some non-negative integer n, $\Psi(\theta)$ becomes a constant that does not depend on $\theta$ and can therefore be omitted from (16).

Minimum Failure Probability Estimation

The MFP estimation mode may be selected when the objective of timing synchronization is to maximize the probability that the beginning of the FFT window lies inside the region formed by the cyclic prefix samples and the first useful sample, i.e., $$P[((\Theta-\hat{\Theta}))_{N_t} \leq N_g], \quad (17)$$

where the operator $((x))_{N_t}$ represents the nonnegative remainder after x is divided by $N_t$. Since $P[((\Theta-\hat{\Theta}))_{N_t} \leq N_g] = E_Y[P[((\Theta-\hat{\Theta}))_{N_t} \leq N_g|Y]$, the MFP estimate of $\Theta$ given $Y=y$ is given by $$\hat{\theta} = \arg\max_{\theta}\left\{\sum_{k=\theta}^{\theta+N_g} p_{\Theta|Y}(((k))_N, \ | \ y)\right\}. \quad (18)$$

The MFP estimate minimizes the probability that the beginning of the FFT window be positioned outside the region comprising the cyclic prefix samples and the first useful sample. From (6) and (9), the MFP estimate of $\Theta$ given $Y=y$ can be expressed as $$\hat{\theta} = \arg\max_{0 \leq \theta \leq N_t-1}\left\{\sum_{k=\theta}^{\theta+N_g} e^{\beta[Re\{\gamma(k)\}-\rho\Phi(k)]-\Psi(k)}\right\}. \quad (19)$$

Minimum Mean Square Error Estimation

Figure 4:
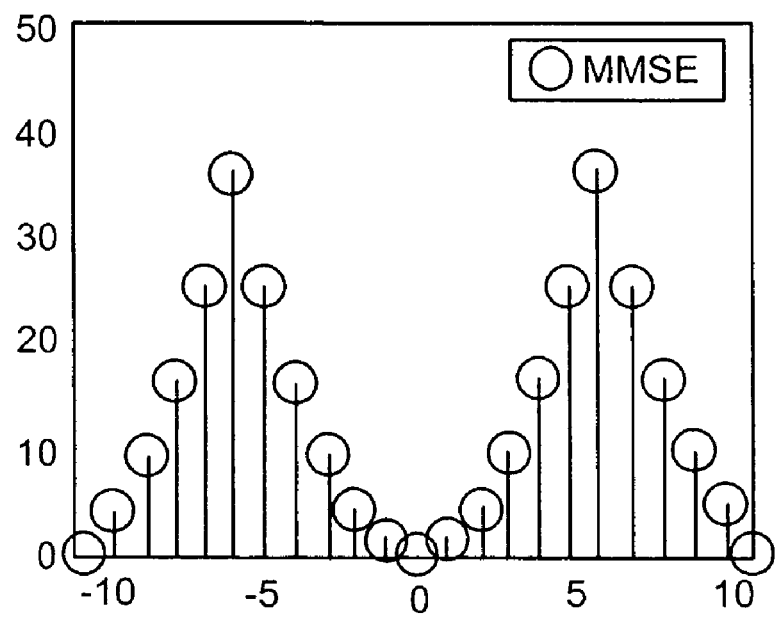
FIG. 4 shows the cost function of a minimum mean square error (MMSE) estimator.

The MMSE estimation mode may be selected when the goal of the timing synchronization is to minimize the mean square error of the delay estimate. The MMSE estimation mode $\hat{\Theta}$ minimizes the average cost $E[c(\hat{\Theta}-\Theta)]$ associated with the estimation error $(\hat{\Theta}-\Theta)$, where the cost function $c(\epsilon)$ is given by $$c(\epsilon) = [\min\{((\epsilon))_{N_1}, N_t - ((\epsilon))_{N_1}\}]^2, \quad (20)$$

which is plotted in FIG. 4 for N=8, $N_g$=4, and $N_t$=12. The averaging in $E[c(\hat{\Theta}-\Theta)]$ is with respect to the mixed pdf $p_{Y,\Theta}(y,\theta)$. Using iterated expectation, it can be shown that the average cost is $$E[c(\hat{\Theta}-\Theta)] = E_Y[E_{\Theta|Y}c(\hat{\Theta}-\Theta)|Y]. \quad (21)$$

Thus, the MMSE estimate of $\Theta$ given $Y=y$ is given by $$\hat{\theta} = \arg\min_{0 \leq \theta \leq N_t-1}\{E_{\Theta|Y}[c(k-\theta)\setminus Y = y]\} = \arg\min_{0 \leq \theta \leq N_t}\left\{\sum_{\theta=0}^{N_t-1} c(k-\theta)p_{\Theta|Y}(\theta \ | \ y)\right\}. \quad (22)$$

Although (22) is given the name minimum mean square error estimate, the average cost is not exactly equal to the mean square error because of the periodicity of the error. From (6) and (9), the MMSE estimate of $\Theta$ given $Y=y$ can be expressed as $$\hat{\theta} = \arg\min_{0 \leq \theta \leq N_t}\left\{\sum_{\theta=0}^{N_t-1} c(k-\theta)e^{\beta[Re\{\gamma(\theta)\}-\rho\Phi(\theta)]-\Psi(\theta)}\right\}, \quad (23)$$

Minimum Modified Mean Square Error Estimation

Figure 5:
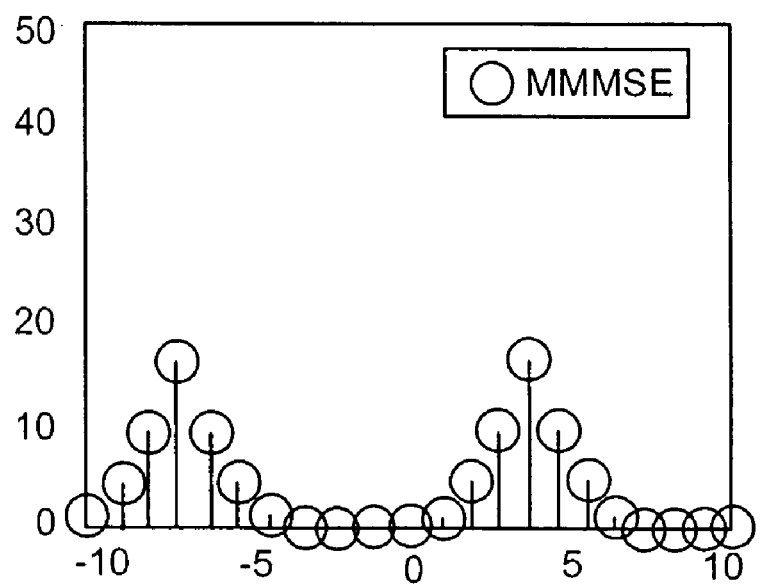
FIG. 5 shows the cost function of a minimum modified mean square error (MMMSE) estimator.

The MMMSE estimation mode may be selected when the goal of the timing synchronization is to minimize the mean square of the modified error with the modified error defined as the distance between the beginning of the FFT window and the cyclic prefix. The MMMSE estimation mode minimizes the average cost $E[c(\hat{\Theta}-\Theta)]$ with the following cost function:

$$c(\epsilon) = [\max\{\min\{((\epsilon))_{N_1}, N-((\epsilon))_{N_1}\}, 0\}]^2, \quad (24)$$

which is plotted in FIG. 5 for N=8, $N_g$=4, and $N_t$=12. The MMMSE estimate of $\Theta$ given $Y=y$ is given by (23) using (24) for the cost function.

Figure 6:
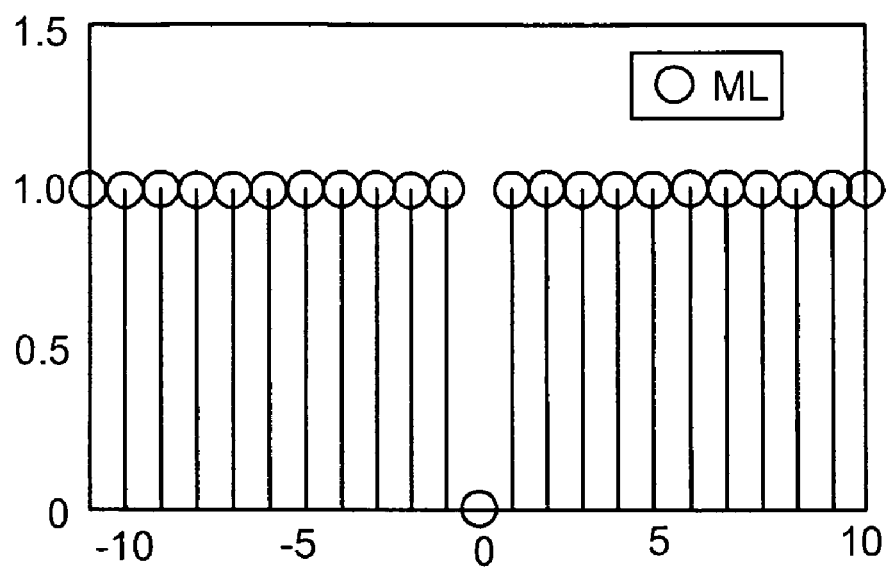
FIG. 6 shows the cost function of a maximum likelihood (ML) estimator.
Figure 7:
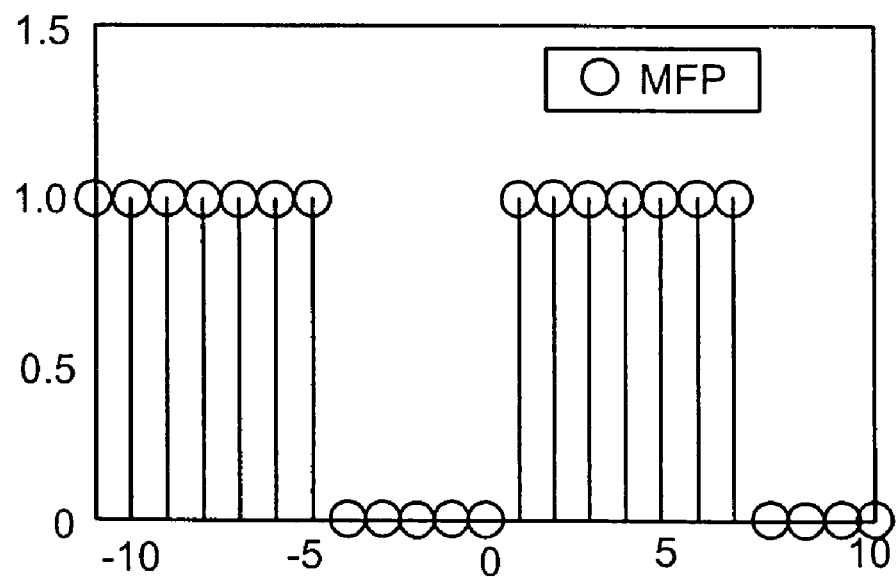
FIG. 7 shows the cost function of a minimum failure probability (MFP) estimator.

In fact, it can be shown that the ML estimation mode is an estimation mode that minimizes the average cost $E[c(\hat{\Theta}-\Theta)]$, where the cost function is $$c(\varepsilon) = \begin{cases} 0, & \varepsilon = 0 \\ 1, & \text{otherwise} \end{cases}, \quad (25)$$

which is plotted in FIG. 6 for N=8, $N_g$=4, and $N_t$=12, whereas the MFP estimation mode minimizes $E[c(\hat{\Theta}-\Theta))]$ with $$c(\varepsilon) = \begin{cases} 0, & -N_g \leq \varepsilon \leq 0 \text{ or } N \leq \varepsilon \\ 1, & \text{otherwise} \end{cases}, \quad (26)$$

which is plotted in FIG. 7 for N=8, $N_g$=4, and $N_t$=12.

Minimizing Average Cost For A General Cost Function

The ML, MFP, MMSE, and MMMSE estimators described above are examples of Bayesian estimators with specific cost functions. Estimators for other specific cost functions are contemplated. In an embodiment, for the general case of a given cost function, Eq. (23) can be used to minimize the average cost. Thus, Eq. (23) can be used to minimize the average cost for the specific cost functions described above and other contemplated cost functions.

FIGS. 8-13 are plots of simulation results used to compare the performance of the MFP, MMSE, and MMMSE estimation modes with that of the ML estimation mode. The observation window size for the simulations was $N_t$+N. This observation window always contains $N_g$ cyclic prefix samples whose correlated samples also lie inside the observation window. The number of samples in the useful part of an OFDM symbol is fixed at N=64.

Figure 8:
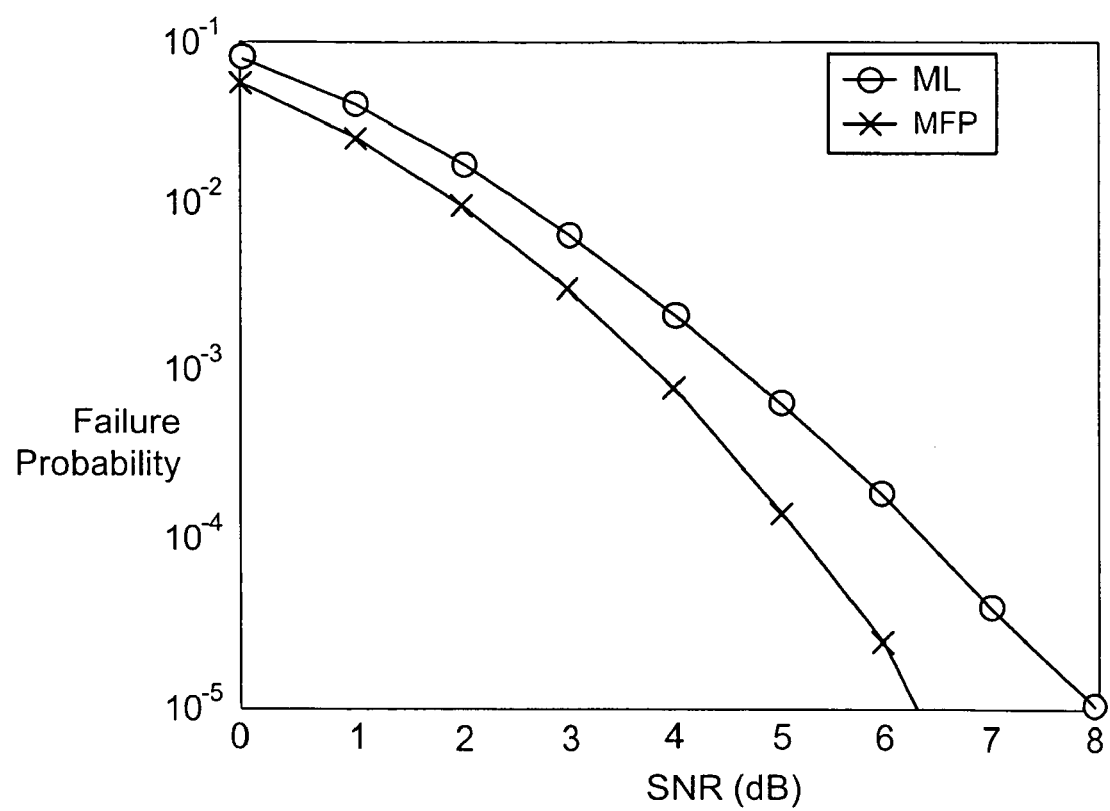
FIG. 8 is a plot showing the failure probability of the ML estimation mode and the MFP estimation mode.

FIG. 8 shows the failure probability of the ML estimation mode and the MFP estimation mode. In case of the ML estimation mode, the beginning of the FFT window was shifted to the left by $N_g/2$ for the fair comparison with the MFP estimation mode. As can be seen from the plot, the MFP estimation mode achieves smaller probability of failure than the ML estimation mode. The SNR gain by using the MFP estimation mode varies depending on the target probability of failure.

Figure 9:
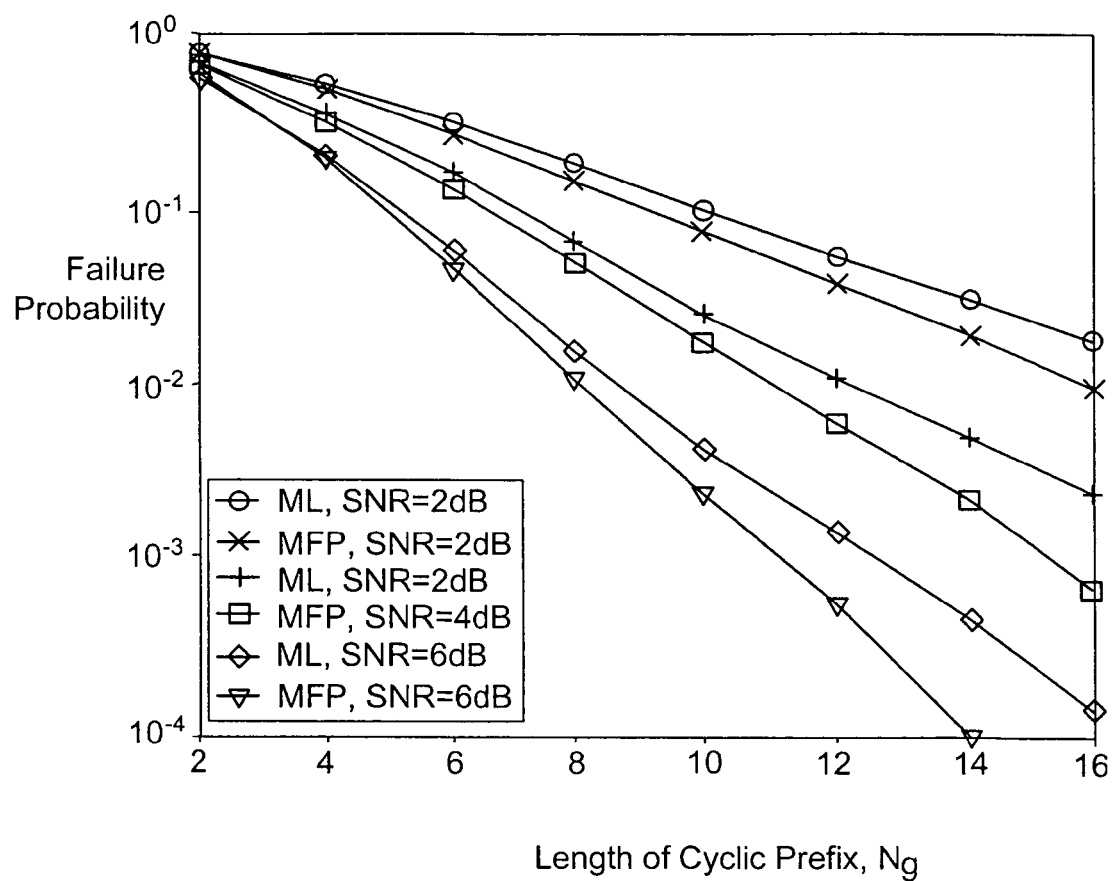
FIG. 9 is a plot showing the failure probability of the ML estimation mode and the MFP estimation mode for varying number of cyclic prefix samples.

FIG. 9 shows the failure probability for varying number of cyclic prefix samples. The MFP estimation mode achieves smaller failure probability than the ML estimation mode. It can also be seen from the plot that the failure probability decreases as the number of cyclic prefix samples increases for both the ML estimation mode and the MFP estimation mode. This can be explained as follows. Both estimation modes use the correlation between the cyclic prefix samples and the corresponding useful samples for symbol timing estimation, and the sample correlation becomes less noisy as the number of cyclic prefix samples increases. Moreover, the region comprised of cyclic prefix samples and the first useful sample expands as the number of cyclic prefix samples increases. Thus, the failure probability decreases as the number of cyclic prefix samples increases.

Figure 10:
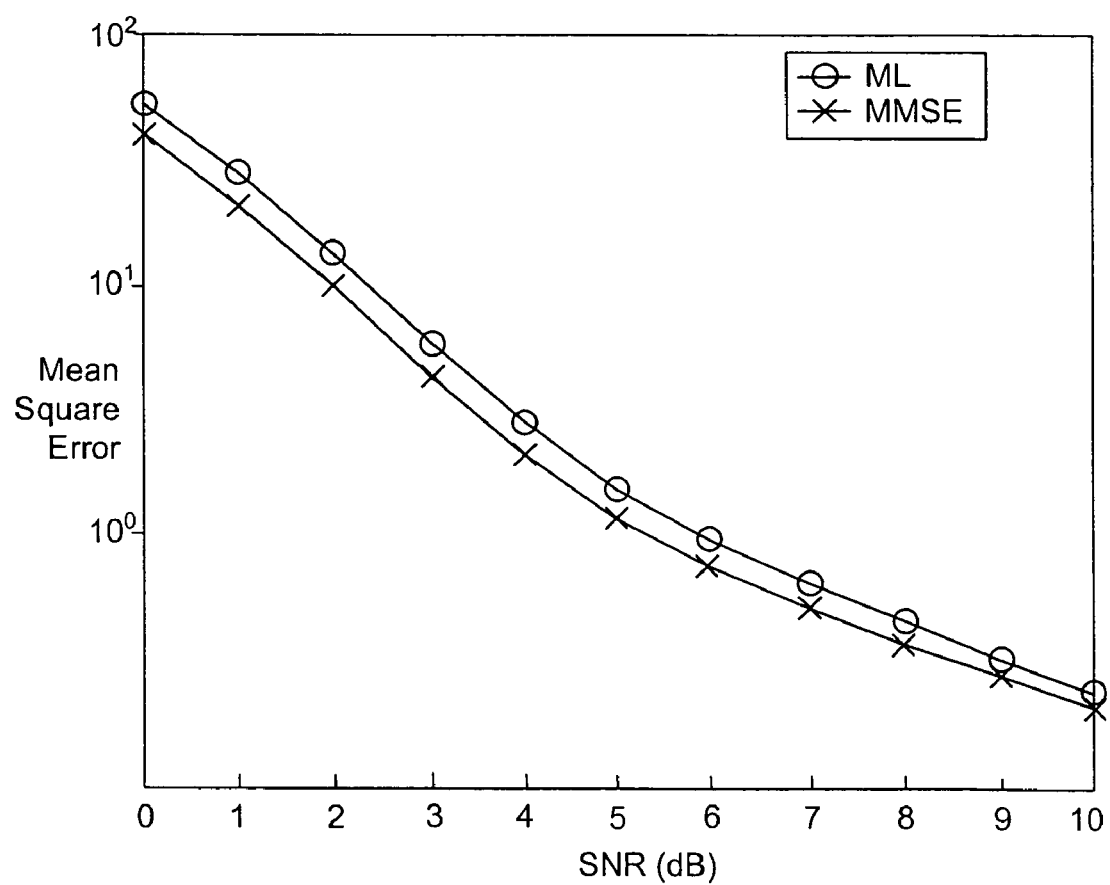
FIG. 10 is a plot showing the mean square error of the ML estimation mode and the MMSE estimation mode for varying SNR.

FIG. 10 shows the mean square error of the ML estimation mode and the MMSE estimation mode for varying SNR. The mean square error of the MMSE estimation mode is smaller than that of the ML estimation mode although the SNR gain by using the MMSE estimation mode is not large.

Figure 11:
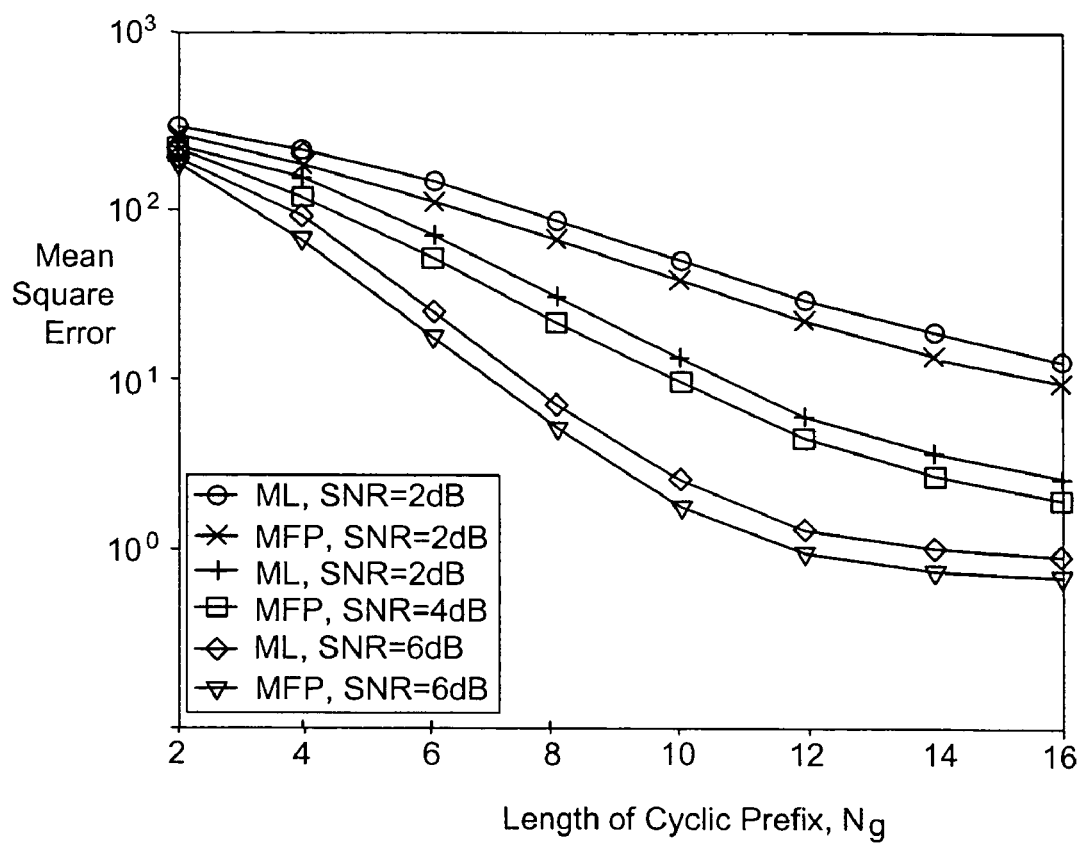
FIG. 11 is a plot showing the mean square error of the ML estimation mode and the MMSE estimation mode for varying number of cyclic prefix samples.

FIG. 11 shows the mean square error for varying number of cyclic prefix samples. The MMSE estimation mode has smaller mean square error than the ML estimation mode. It can be seen from the figure that the mean square error decreases for both the ML estimation mode and the MMSE estimation mode as the number of cyclic prefix samples increases. However, the mean square error does not decrease indefinitely, and the plot shows the mean square error has an error floor. This can be explained intuitively as follows. The difference between the consecutive likelihoods $f_{Y|\Theta}(y|\theta)$ and $f_{Y|\Theta}(y|\theta+1)$ is determined by only two samples because $A_\theta \cup I$ and $A_{\theta+1} \cup I$ contain the same elements except one. The false correlation due to the transmit signal does not decrease for increasing number of cyclic prefix samples even though the noise power in the sample correlation decreases. Thus, the performance of the ML estimation mode and MMSE estimation mode does not improve once the number of the cyclic prefix exceeds a certain threshold value.

Figure 12:
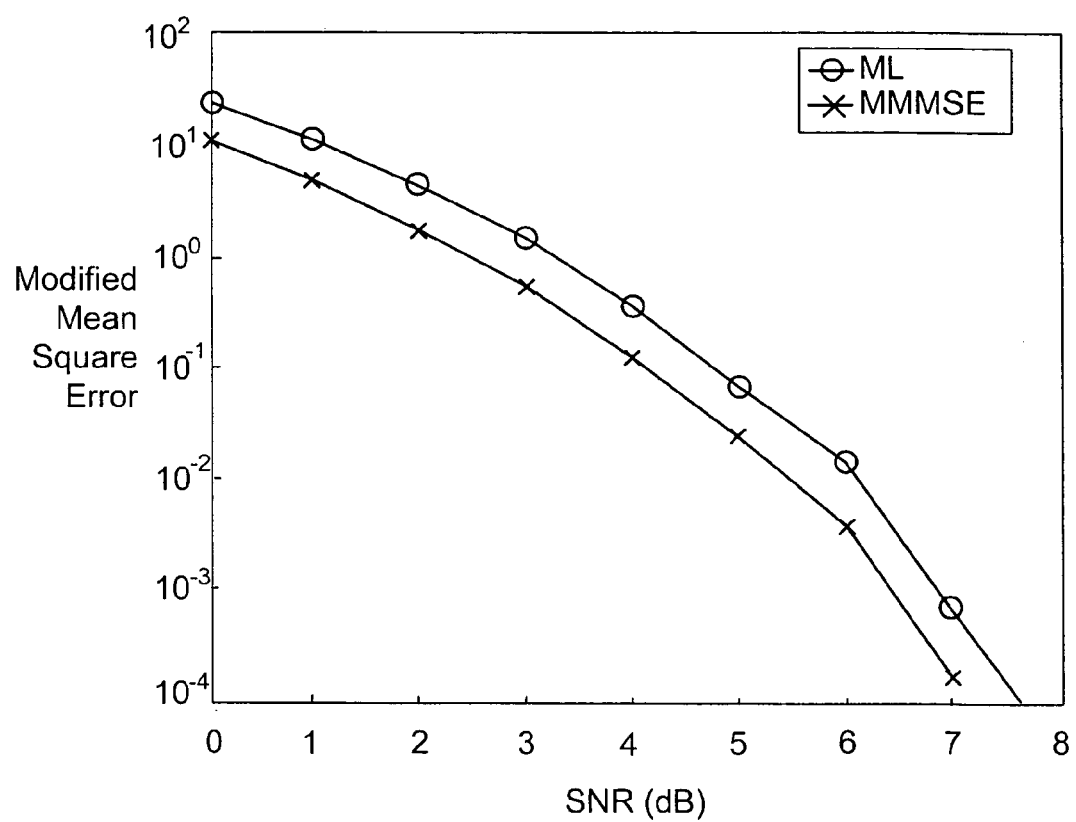
FIG. 12 is a plot showing the modified mean square error for the ML estimation mode and the MMMSE estimation mode.

FIG. 12 is a plot of the modified mean square error defined in (24) for the ML estimation mode and the MMMSE estimation mode. The ML estimation mode has larger modified mean square error than the MMMSE estimation mode for all values of SNR. The SNR gain by using the MMMSE estimation mode is approximately 0.5 dB to 1 dB depending on the operating SNR.

Figure 13:
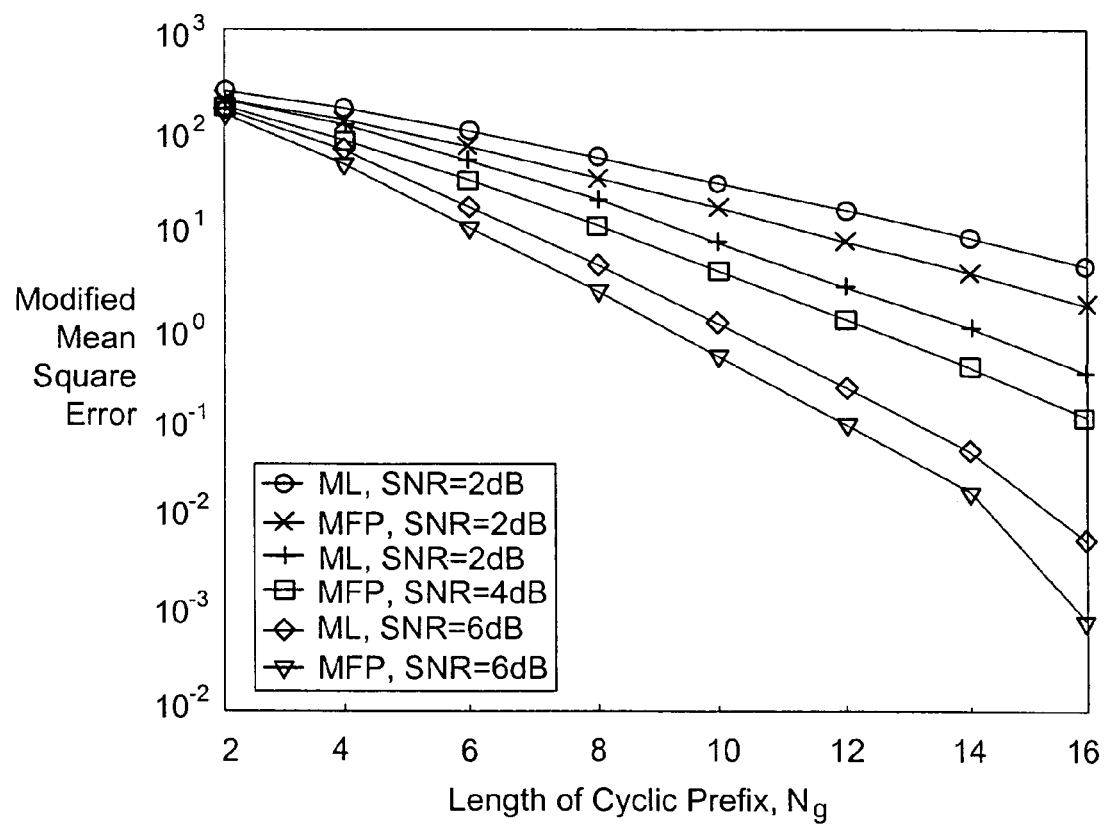
FIG. 13 is a plot showing the modified mean square error of the ML estimation mode and the MMMSE estimation mode for varying number of cyclic prefix samples.

FIG. 13 shows the modified mean square error for varying number of cyclic prefix samples. The MMMSE estimation mode shows better performance in terms of modified mean square error than the ML estimation mode. As the cyclic prefix length increases, the modified mean square error decreases without showing error floor for $N_g \leq 16$, unlike the mean square error. This phenomenon occurs because the failure probability continues to decrease as the cyclic prefix length increases and the error inside the increasing intervals $[-N_g, 0]$ and $[N, N_t-1]$ results in zero cost in terms of modified minimum mean square error.

A number of embodiments have been described. Nevertheless, it will be understood that various modifications may be made without departing from the spirit and scope of the invention. For example, although the estimation modes in this paper were developed for the AWGN channel, the estimation modes for fast Rayleigh fading channels can be derived in a similar fashion. Accordingly, other embodiments are within the scope of the following claims.

The invention claimed is:

1. A method comprising:
   selecting a performance measure from a plurality of performance measures;
   selecting a symbol timing estimation mode from a plurality of symbol timing estimation modes based on the selected performance measure;
   receiving time-domain samples, wherein at least a portion of the time-domain samples belongs to a symbol; and
   estimating a symbol timing offset, using a multi-mode estimator, for the symbol in the selected symbol timing estimation mode.

2. The method of claim 1, wherein said selecting the performance measure comprises selecting a performance measure corresponding to maximizing a probability that the estimated symbol timing offset is equal to a true symbol timing offset.

3. The method of claim 2, wherein said selecting the symbol timing estimation mode comprises a maximum likelihood estimation mode.

4. The method of claim 1, wherein said selecting the performance measure comprises selecting a performance measure corresponding to maximizing a probability that a beginning of a fast Fourier transform window in the symbol lies inside a region formed by a plurality of cyclic prefix samples in the symbol and a first useful sample in the symbol.

5. The method of claim 4, wherein said selecting the symbol timing estimation mode comprises a minimum failure probability estimation mode.

6. The method of claim 5, wherein said estimating comprises solving the equation:

$$\hat{\theta} = \arg\max_{0 \leq \theta \leq N_t-1} \left\{ \sum_{k=\theta}^{\theta+N_g} e^{\beta[\text{Re}\{\gamma(k)\}-\rho\Phi(k)]-\Psi(k)} \right\},$$

where $\hat{\theta}$ is the symbol timing offset estimate,
$N_t$ is the total number of samples in the symbol,
$N_g$ is the number of samples in a cyclic prefix in the symbol,
$N=N_t-N_g$, $$\beta = \frac{2\rho}{(\sigma_X^2 + \sigma_Z^2)(1-\rho^2)},$$

$$\rho = \frac{\sigma_X^2}{(\sigma_X^2 + \sigma_X^2)},$$

$$\gamma(k) = \sum_{n \in A_k \cap I} y[n]y*[n+N],$$

$$\Phi(k) = \frac{1}{2} \sum_{n \in A_k \cap I} (|y[n]|^2 + |y[n+N]|^2),$$

$\Psi(k)=|A_k \cap I|\log(1-\rho^2),$ $I=\{0,1,\ldots,M-N-1\},$ $$A_k = \bigcup_{i=-\infty}^{\infty} \{k+iN_t, \ldots, (k+N_g-1)+iN_t\},$$

y[n] is a received sample with index n, $\sigma_X^2$ a transmit signal power, $\sigma_Z^2$ is a noise power, and M is the size of an observation window.

7. The method of claim 1, wherein said selecting the performance measure comprises selecting a performance measure corresponding to minimizing a mean square error of the symbol timing offset estimate.

8. The method of claim 7, wherein said selecting the symbol timing estimation mode comprises a minimum mean square error estimation mode.

9. The method of claim 8, wherein said estimating comprises solving the equation:

$$\hat{\theta} = \arg\max_{0 \leq \theta \leq N_t} \left\{ \sum_{\theta=0}^{N_t-1} c(k-\theta) e^{\beta[Re\{\gamma(\theta)\} - \rho\Phi(\theta)] - \Psi(\theta)} \right\},$$

with an error function $c(\epsilon) = [\min\{((\epsilon))_{N_t}, N_t - ((\epsilon))_{N_t}\}]^2$, and where $\hat{\theta}$ is the symbol timing offset estimate, $N_t$ is the total number of samples in the symbol, $N_g$ is the number of samples in a cyclic prefix in the symbol, $N = N_t - N_g,$ $$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n] y^*[n+N],$$

$$\Phi(\theta) = \frac{1}{2} \sum_{n \in A_\theta \cap I} (|y[n]|^2 + |y[n+N]|^2),$$

$\Psi(\theta) = |A_\theta \cap I|\log(1-\rho^2),$ $I=\{0,1,\ldots,M-N-1\},$ $$A_\theta = \bigcup_{i=-\infty}^{\infty} \{\theta+iN_t, \ldots, (\theta+N_g-1)+iN_t\},$$

y[n] is a received sample with index n, $\sigma_X^2$ is a transmit signal power, $\sigma_Z^2$ is a noise power, and M is the size of an observation window.

10. The method of claim 1, wherein said selecting the performance measure comprises selecting a performance measure corresponding to minimizing a mean square of a modified error of the symbol timing offset estimate, wherein the modified error comprises a distance between a beginning of a fast Fourier transform window in the symbol and a cyclic prefix in the symbol.

11. The method of claim 10, wherein said selecting the symbol timing estimation mode comprises a minimum modified mean square error estimation mode.

12. The method of claim 11, wherein said estimating comprises solving the equation:

$$\hat{\theta} = \arg\max_{0 \leq \theta \leq N_t} \left\{ \sum_{\theta=0}^{N_t-1} c(k-\theta) e^{\beta[Re\{\gamma(\theta)\} - \rho\Phi(\theta)] - \Psi(\theta)} \right\},$$

with an error function $c(\epsilon) = [\max\{\min\{((\epsilon))_{N_t}, N-((\epsilon))_{N_t}\}, 0\}]^2,$ and where where $\hat{\theta}$ is the symbol timing offset estimate, $N_t$ is the total number of samples in the symbol, $N_g$ is the number of samples in the cyclic prefix in the symbol, $N = N_t - N_g$ $$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n] y^*[n+N],$$

$$\Phi(\theta) = \frac{1}{2} \sum_{n \in A_\theta \cap I} (|y[n]|^2 + |y[n+N]|^2),$$

$\Psi(\theta) = |A_\theta \cap I|\log(1-\rho^2),$ $=\{0,1,\ldots,M-N-1\},$ $$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

13. The method of claim 1, wherein said receiving the time-domain samples comprises receiving a plurality of time-domain samples belonging to two or more Orthogonal Frequency Division Multiplexing (OFDM) symbols.

14. The method of claim 1, wherein said estimating comprises minimizing an average cost function associated with the selected symbol timing estimation mode.

15. The method of claim 14, wherein said minimizing the average cost function comprises solving the equation:

$$\hat{\theta} = \arg\min_{0 \leq k \leq N_t} \left\{ \sum_{\theta=0}^{N_t-1} c(k - \theta) e^{\beta[Re\{\gamma(\theta)\} - \rho\Phi(\theta)] - \Psi(\theta)} \right\},$$

with an error function $$c(\epsilon) = [\min\{((\epsilon))_{N_t}, N_t - ((\epsilon))_{N_t}\}]^2,$$

and where $\hat{\theta}$ is the symbol timing offset estimate,
$N_t$ is the total number of samples in the symbol,
$N_g$ is the number of samples in a cyclic prefix in the symbol, $N = N_t - N_g$, $$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\gamma(\theta) = \sum_{n \in A_0 \cap I} y[n] y^*[n + N],$$

$$\Phi(\theta) = \frac{1}{2} \sum_{n \in A_0 \cap I} (|y[n]|^2 + |y[n + N]|^2),$$

$\Psi(\theta) = |A_\theta \cap I| \log(1 - \rho^2)$, $\Psi(\theta) = |A_\theta \cap I| \log(1 - \rho^2)$, $I = \{0, 1, \ldots, M - N - 1\}$, $$A_\theta = \bigcap_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ M is a noise power, and
M is the size of an observation window.

16. An apparatus comprising:
a receiver to receive a symbol;
a multi-mode estimator having a plurality of symbol timing estimation modes, the estimator operative to estimate a symbol timing offset for the symbol in a selected one of the modes; and
a selector to select a performance measure from a plurality of performance measures and select a symbol timing estimation mode from the plurality of symbol timing estimation modes based on the selected performance measure.

17. The apparatus of claim 16, wherein the plurality of performance measures comprises a performance measure corresponding to maximizing a probability that the estimated symbol timing offset is equal to a true symbol timing offset.

18. The apparatus of claim 17, wherein the plurality of symbol timing estimation modes comprises a maximum likelihood estimation mode.

19. The apparatus of claim 16, wherein the plurality of performance measures comprises a performance measure corresponding to maximizing a probability that a beginning of a fast Fourier transform window in the symbol lies inside a region formed by a plurality of cyclic prefix samples in the symbol and a first useful sample in the symbol.

20. The apparatus of claim 19, wherein the plurality of symbol timing estimation modes comprises a minimum failure probability estimation mode.

21. The apparatus of claim 20, wherein the multi-mode estimator is operative to solve the equation:

$$\hat{\theta} = \arg\max_{0 \leq \theta \leq N_t - 1} \left\{ \sum_{k=\theta}^{\theta + N_g} e^{\beta[Re\{\gamma(k)\} - \rho\Phi(k)] - \Psi(k)} \right\},$$

where $\hat{\theta}$ is the symbol timing offset estimate,
$N_t$ is the total number of samples in the symbol,
$N_g$ is the number of samples in a cyclic prefix in the symbol, $N = N_t - N_g$, $$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\gamma(k) = \sum_{n \in A_k \cap I} y[n]y^*[n+N],$$

$$\Phi(k) = \frac{1}{2} \sum_{n \in A_k \cap I} (|y[n]|^2 + |y[n+N]|^2),$$

$$\Psi(k) = |A_k \cap I| \log(1-\rho^2),$$

$$I = \{0,1,\ldots,M-N-1\},$$

$$A_k = \bigcup_{i=-\infty}^{\infty} \{k+iN_t, \ldots, (k+N_g-1)+iN_t\},$$

y[n] is a received sample with index n,
$\sigma_X^2$ is a transmit signal power,
$\sigma_Z^2$ is a noise power, and
M is the size of an observation window.

22. The apparatus of claim 16, wherein the plurality of performance measures comprises a performance measure corresponding to minimizing a mean square error of the symbol timing offset estimate.

23. The apparatus of claim 22, wherein the plurality of symbol timing estimation modes comprises a minimum mean square error estimation mode.

24. The apparatus of claim 23, wherein the multi-mode estimator is operative to solve the equation:

$$\hat{\theta} = \arg\min_{0 \le k \le N_t} \left\{ \sum_{\theta=0}^{N_t-1} c(k-\theta)e^{\beta[Re\{\gamma(\theta)\}-\rho\Phi(\theta)]-\Psi(\theta)} \right\},$$

with an error function $$c(\epsilon) = [\min\{((\epsilon))_{N_t}, N_t - ((\epsilon))_{N_t}\}]^2,$$

and where
where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n]y*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$$I = \{0,1,\ldots,M-N-1\},$$

$$A_\theta = \bigcup_{i=-\infty}^{\infty} \{\theta+iN_t, \ldots, (\theta+N_g-1)+iN_t\},$$

y[n] is a received sample with index n,
$\sigma_X^2$ is a transmit signal power,
$\sigma_Z^2$ is a noise power, and
M is the size of an observation window.

25. The apparatus of claim 16, wherein the plurality of performance measures comprises a performance measure corresponding to minimizing a mean square of a modified error of the symbol timing offset estimate, wherein the modified error comprises a distance between a beginning of a fast Fourier transform window in the symbol and a cyclic prefix in the symbol.

26. The apparatus of claim 25, wherein the plurality of symbol timing estimation modes comprises a minimum modified mean square error estimation mode.

27. The apparatus of claim 26, wherein the multi-mode estimator is operative to solve the equation:

$$\hat{\theta} = \arg\min_{0 \le k \le N_t} \left\{ \sum_{\theta=0}^{N_t-1} c(k-\theta)e^{\beta[Re\{\gamma(\theta)\}-\rho\Phi(\theta)]-\Psi(\theta)} \right\},$$

with an error function $$c(\epsilon) = [\max\{\min\{((\epsilon))_{N_t}, N-((\epsilon))_{N_t}\}, 0\}]^2,$$

and where
where $\hat{\theta}$ is the symbol timing offset estimate,
$N_t$ is the total number of samples in the symbol,
$N_g$ is the number of samples in the cyclic prefix in the symbol, $$N = N_t - N_g$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n]y*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

28. The apparatus of claim 16, wherein the symbol comprises an Orthogonal Frequency Division Multiplexing (OFDM) symbol, and wherein the multi-mode estimator is operative to estimate the symbol timing offset using a plurality of time-domain samples belonging to two or more OFDM symbols.

29. The apparatus of claim 16, wherein the multi-mode estimator is operative to minimize an average cost function associated with the selected symbol timing estimation mode.

30. The apparatus of claim 29, wherein the multi-mode estimator is operative to solve the equation:

$$\hat{\theta} = \arg\min_{0 \leq k \leq N_t} \left\{ \sum_{\theta=0}^{N_t-1} c(k-\theta) e^{\beta[Re\{\gamma(\theta)\} - \rho\Phi(\theta)] - \Psi(\theta)} \right\},$$

with an error function $$c(\epsilon) = [\min\{((\epsilon))_{N_t}, N_t - ((\epsilon))_{N_t}\}]^2,$$

and
where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n] y*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

31. An apparatus comprising:
means for receiving a symbol;
means for selecting a performance measure from a plurality of performance measures;
means for selecting a symbol timing estimation mode from a plurality of symbol timing estimation modes based on the selected performance measure; and
estimator means for estimating a symbol timing offset for the symbol in the selected symbol timing estimation mode.

32. The apparatus of claim 31, wherein the plurality of performance measures comprises a performance measure corresponding to maximizing a probability that the estimated symbol timing offset is equal to a true symbol timing offset.

33. The apparatus of claim 32, wherein the plurality of symbol timing estimation modes comprises a maximum likelihood estimation mode.

34. The apparatus of claim 31, wherein the plurality of performance measures comprises a performance measure corresponding to maximizing a probability that a beginning of a fast Fourier transform window in the symbol lies inside a region formed by a plurality of cyclic prefix samples in the symbol and a first useful sample in the symbol.

35. The apparatus of claim 34, wherein the plurality of symbol timing estimation modes comprises a minimum failure probability estimation mode.

36. The apparatus of claim 35, wherein the estimator means comprises means for solving the equation:

$$\hat{\theta} = \arg\min_{0 \leq \theta \leq N_t - 1} \left\{ \sum_{k=\theta}^{\theta+N_g} e^{\beta[Re\{\gamma(k)\} - \rho\Phi(k)] - \Psi(k)} \right\},$$

where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(k) = \sum_{n \in A_k \cap I} y[n] y*[n+N],$$

$$\Phi(k) = \frac{1}{2} \sum_{n \in A_k \cap I} (|y[n]|^2 + |y[n+N]|^2),$$

$$\Psi(k) = |A_k \cap I| \log(1-\rho^2),$$

$$I = \{0, 1, \ldots, M-N-1\},$$

$$A_k = \bigcup_{i=-\infty}^{\infty} \{k + iN_t, \ldots, (k + N_g - 1) + iN_t\},$$

y[n] is a received sample with index n,
$\sigma_X^2$ is a transmit signal power,
$\sigma_Z^2$ is a noise power, and
M is the size of an observation window.

37. The apparatus of claim 31, wherein the plurality of performance measures comprises a performance measure corresponding to minimizing a mean square error of the symbol timing offset estimate.

38. The apparatus of claim 37, wherein the plurality of symbol timing estimation modes comprises a minimum mean square error estimation mode.

39. The apparatus of claim 38, wherein the estimator means comprises means for solving the equation:

$$\hat{\theta} = \arg\min_{0 \le \theta \le N_t} \left\{ \sum_{\theta=0}^{N_t-1} c(k-\theta) e^{\beta[Re\{\gamma(\theta)\} - \rho \Phi(\theta)] - \Psi(\theta)} \right\},$$

with an error function $$c(\epsilon) = [\min\{((\epsilon))_{N_t}, N_t - ((\epsilon))_{N_t}\}]^2,$$

and where
where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n] y*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power and
M is the size of an observation window.

40. The apparatus of claim 31, wherein the plurality of performance measures comprises a performance measure corresponding to minimizing a mean square of a modified error of the symbol timing offset estimate, wherein the modified error comprises a distance between a beginning of a fast Fourier transform window in the symbol and a cyclic prefix in the symbol.

41. The apparatus of claim 40, wherein the plurality of symbol timing estimation modes comprises a minimum modified mean square error estimation mode.

42. The apparatus of claim 41, wherein the estimator means comprises means for solving the equation:

$$\hat{\theta} = \arg\min_{0 \le k \le N_t} \left\{ \sum_{\theta=0}^{N_t-1} c(k-\theta) e^{\beta[Re\{\gamma(\theta)\} - \rho \Phi(\theta)] - \Psi(\theta)} \right\},$$

with an error function $$c(\epsilon) = [\max\{\min\{((\epsilon))_{N_t}, N_t - ((\epsilon))_{N_t}\}, 0\}]^2,$$

and where
where $\hat{\theta}$ is the symbol timing offset estimate,
$N_t$ is the total number of samples in the symbol,
$N_g$ is the number of samples in the cyclic prefix in the symbol, $$N = N_t - N_g$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n]y^*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

43. The apparatus of claim 31, wherein the symbol comprises an Orthogonal Frequency Division Multiplexing (OFDM) symbol, and wherein the estimator means is operative to estimate the symbol timing offset using a plurality of time-domain samples belonging to two or more OFDM symbols.

44. The apparatus of claim 31, wherein the estimator means is operative to minimize an average cost function associated with the selected symbol timing estimation mode.

45. The apparatus of claim 44, wherein the estimator means comprises means for solving the equation:

$$\hat{\theta} = \arg\min_{0 \le k \le N_t} \left\{ \sum_{\theta=0}^{N_t-1} c(k-\theta) e^{\beta[Re\{\gamma(\theta)\} - \rho\Phi(\theta)] - \Psi(\theta)} \right\},$$

with an error function $$c(\epsilon) = [\min\{((\epsilon))_{N_t}, N_t - ((\epsilon))_{N_t}\}]^2,$$

and
where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n]y^*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

46. A system comprising:
a transmitter to transmit a symbol;
a receiver to receive the transmitted symbol;
a multi-mode estimator having a plurality of symbol timing estimation modes, the estimator operative to estimate a symbol timing offset for the symbol in a selected one of the modes; and
a selector to select a performance measure from a plurality of performance measures and select a symbol timing estimation mode from the plurality of symbol timing estimation modes based on the selected performance measure.

47. The system of claim 46, wherein the plurality of performance measures comprises a performance measure corresponding to maximizing a probability that the estimated symbol timing offset is equal to a true symbol timing offset.

48. The system of claim 47, wherein the plurality of symbol timing estimation modes comprises a maximum likelihood estimation mode.

49. The system of claim 46, wherein the plurality of performance measures comprises a performance measure corresponding to maximizing a probability that a beginning of a fast Fourier transform window in the symbol lies inside a region formed by a plurality of cyclic prefix samples in the symbol and a first useful sample in the symbol.

50. The system of claim 49, wherein the plurality of symbol timing estimation modes comprises a minimum failure probability estimation mode.

51. The system of claim 50, wherein the multi-mode estimator is operative to solve the equation:

$$\hat{\theta} = \arg\max_{0 \le \hat{\theta} \le N_t - 1} \left\{ \sum_{k=\theta}^{\theta+N_g} e^{\beta[Re\{\gamma(k)\} - \rho\Phi(k)] - \Psi(k)} \right\},$$

where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(k) = \sum_{n \in A_k \cap I} y[n]y*[n+N],$$

$$\Phi(k) = \frac{1}{2} \sum_{n \in A_k \cap I} (|y[n]|^2 + |y[n+N]|^2),$$

$$\Psi(k) = |A_k \cap I| \log(1-\rho^2),$$

$$I = \{0, 1, \ldots, M-N-1\},$$

$$A_k = \bigcup_{i=-\infty}^{\infty} \{k+iN_t, \ldots, (k+N_g-1)+iN_t\},$$

y[n] is a received sample with index n,
$\sigma_X^2$ is a transmit signal power,
$\sigma_Z^2$ is a noise power, and
M is the size of an observation window.

52. The system of claim 46, wherein the plurality of performance measures comprises a performance measure corresponding to minimizing a mean square error of the symbol timing offset estimate.

53. The system of claim 52, wherein the plurality of symbol timing estimation modes comprises a minimum mean square error estimation mode.

54. The system of claim 53, wherein the multi-mode estimator is operative to solve the equation:

$$\hat{\theta} = \arg\min_{0 \le k \le N_t} \left\{ \sum_{\theta=0}^{N_t-1} c(k-\theta) e^{\beta[Re\{\gamma(\theta)\} - \rho\Phi(\theta)] - \Psi(\theta)} \right\},$$

with an error function $$c(\epsilon) = [min\{((\epsilon))_{N_t}, N_t-((\epsilon))_{N_t}\}]^2,$$

and where
where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_0 \cap I} y[n]y*[n+N],$$

$$\Phi(\theta) = \frac{1}{2} \sum_{n \in A_0 \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta+iN_t, \ldots, (\theta+N_g-1)+iN_t\},$$

y[n] is a received sample with index n,
$\sigma_X^2$ is a transmit signal power,
$\sigma_Z^2$ is a noise power, and
M is the size of an observation window.

55. The system of claim 46, wherein the plurality of performance measures comprises a performance measure corresponding to minimizing a mean square of a modified error of the symbol timing offset estimate, wherein the modified error comprises a distance between a beginning of a fast Fourier transform window in the symbol and a cyclic prefix in the symbol.

56. The system of claim 55, wherein the plurality of symbol timing estimation modes comprises a minimum modified mean square error estimation mode.

57. The system of claim 56, wherein the multi-mode estimator is operative to solve the equation:

$$\hat{\theta} = \arg\min_{0 \le k \le N_t} \left\{ \sum_{\theta=0}^{N_t-1} c(k-\theta) e^{\beta[Re\{\gamma(\theta)\} - \rho\Phi(\theta)] - \Psi(\theta)} \right\},$$

with an error function $$c(\epsilon) = [\max\{\min\{((\epsilon))_{N_t}, N_t-((\epsilon))_{N_t}\}, 0\}]^2,$$

and where
where $\hat{\theta}$ is the symbol timing offset estimate,
$N_t$ is the total number of samples in the symbol,
$N_g$ is the number of samples in the cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_0 \cap I} y[n] y*[n+N],$$

$$\Phi(\theta) = \frac{1}{2} \sum_{n \in A_0 \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

58. The system of claim 46, wherein the symbol comprises an Orthogonal Frequency Division Multiplexing (OFDM) symbol, and wherein the multi-mode estimator is operative to estimate the symbol timing offset using a plurality of time-domain samples belonging to two or more OFDM symbols.

59. The system of claim 46, wherein the multi-mode estimator is operative to minimize an average cost function associated with the selected symbol timing estimation mode.

60. The system of claim 59, wherein the multi-mode estimator is operative to solve the equation:

$$\hat{\theta} = \arg\min_{0 \le k \le N_t} \left\{ \sum_{\theta=0}^{N_t-1} c(k-\theta) e^{\beta[Re\{\gamma(\theta)\} - \rho\Phi(\theta)] - \Psi(\theta)} \right\},$$

with an error function $$c(\epsilon) = [\min\{(\epsilon)_{N_t}, N_t - (\epsilon)_{N_t}\}]^2,$$

and
where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1-\rho^2)},$$

$$\rho = \frac{\sigma_X^2}{(\sigma_X^2 + \sigma_Z^2)},$$

$$\gamma(\theta) = \sum_{n \in A_\theta \cap I} y[n] y^*[n+N],$$

$$\Phi(\theta) = \frac{1}{2} \sum_{n \in A_\theta \cap I} (|y[n]|^2 + |y[n+N]|^2),$$

$$\Psi(\theta) = |A_\theta \cap I| \log(1-\rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

61. A system comprising:
means for receiving a symbol;
means for selecting a performance measure from a plurality of performance measures;
means for selecting a symbol timing estimation mode from a plurality of symbol timing estimation modes based on the selected performance measure; and
estimator means for estimating a symbol timing offset for the symbol in the selected symbol timing estimation mode.

62. The system of claim 61, wherein the plurality of performance measures comprises a performance measure corresponding to maximizing a probability that the estimated symbol timing offset is equal to a true symbol timing offset.

63. The system of claim 62, wherein the plurality of symbol timing estimation modes comprises a maximum likelihood estimation mode.

64. The system of claim 61, wherein the plurality of performance measures comprises a performance measure corresponding to maximizing a probability that a beginning of a fast Fourier transform window in the symbol lies inside a region formed by a plurality of cyclic prefix samples in the symbol and a first useful sample in the symbol.

65. The system of claim 64, wherein the plurality of symbol timing estimation modes comprises a minimum failure probability estimation mode.

66. The system of claim 65, wherein the estimator means comprises means for solving the equation:

$$\hat{\theta} = \arg\min_{0 \le \theta \le N_t-1} \left\{ \sum_{\theta=0}^{\theta+N_g} e^{\beta[Re\{\gamma(k)\} - \rho\Phi(k)] - \Psi(k)} \right\},$$

where $\hat{\theta}$ is the symbol timing offset estimate,
$N_t$ is the total number of samples in the symbol,
$N_g$ is the number of samples in a cyclic prefix in the symbol, $N=N_t-N_g$, $$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\gamma(k) = \sum_{n \in A_k \cap I} y[n] y^*[n + N],$$

$$\Phi(k) = \frac{1}{2} \sum_{n \in A_k \cap I} (|y[n]|^2 + |y[n + N]|^2),$$

$\Psi(k) = |A_k \cap I| \log(1-\rho^2)$, $I=\{0,1,\ldots,M-N-1\}$, $$A_k = \bigcup_{i=-\infty}^{\infty} \{k + iN_t, \ldots, (k + N_g - 1) + iN_t\},$$

y[n] is a received sample with index n,
$\sigma_X^2$ is a transmit signal power,
$\sigma_Z^2$ is a noise power, and
M is the size of an observation window.

67. The system of claim 61, wherein the plurality of performance measures comprises a performance measure corresponding to minimizing a mean square error of the symbol timing offset estimate.

68. The system of claim 67, wherein the plurality of symbol timing estimation modes comprises a minimum mean square error estimation mode.

69. The system of claim 68, wherein the estimator means comprises means for solving the equation:

$$\hat{\theta} = \arg\min_{0 \le k \le N_t} \left\{ \sum_{\theta=0}^{N_t-1} c(k - \theta) e^{\beta[Re\{\gamma(\theta)\} - \rho\Phi(\theta)] - \Psi(\theta)} \right\},$$

with an error function $c(\epsilon)=[\min\{((\epsilon))_{N_t}, N_t-((\epsilon))_{N_1}\}]^2$, and where
where $\hat{\theta}$ is the symbol timing offset estimate,
$N_t$ is the total number of samples in the symbol,
$N_g$ is the number of samples in a cyclic prefix in the symbol, $N=N_t-N_g$, $$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\gamma(\theta) = \sum_{n \in A_\theta \cap I} y[n] y*[n + N],$$

$$\Phi(\theta) = \frac{1}{2} \sum_{n \in A_\theta \cap I} (|y[n]|^2 + |y[n + N]|^2),$$

$\Psi(\theta) = |A_\theta \cap I| \log(1-\rho^2)$, $I=\{0,1,\ldots,M-N-1\}$, $$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

70. The system of claim 61, wherein the plurality of performance measures comprises a performance measure corresponding to minimizing a mean square of a modified error of the symbol timing offset estimate, wherein the modified error comprises a distance between a beginning of a fast Fourier transform window in the symbol and a cyclic prefix in the symbol.

71. The system of claim 70, wherein the plurality of symbol timing estimation modes comprises a minimum modified mean square error estimation mode.

72. The system of claim 71, wherein the estimator means comprises means for solving the equation:

$$\hat{\theta} = \arg\min_{0 \le k \le N_t} \left\{ \sum_{\theta=0}^{N_t-1} c(k - \theta) e^{\beta[Re\{\gamma(\theta)\} - \rho\Phi(\theta)] - \Psi(\theta)} \right\},$$

with an error function $c(\epsilon)=[\max\{\min\{((\epsilon))_{N_t}, N-((\epsilon))_{N_t}\}, 0\}]^2$, and where
where $\hat{\theta}$ is the symbol timing offset estimate,
$N_t$ is the total number of samples in the symbol,
$N_g$ is the number of samples in the cyclic prefix in the symbol, $N=N_t-N_g$, $$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\gamma(\theta) = \sum_{n \in A_\theta \cap I} y[n] y*[n + N],$$

$$\Phi(\theta) = \frac{1}{2} \sum_{n \in A_\theta \cap I} (|y[n]|^2 + |y[n + N]|^2),$$

$$\Psi(\theta) = |A_\theta \cap I| \log(1 - \rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ a transmit signal power,
$\sigma_Z^2$ is a noise power, and
M is the size of an observation window.

73. The system of claim 61, wherein the symbol comprises an Orthogonal Frequency Division Multiplexing (OFDM) symbol, and wherein the estimator means is operative to estimate the symbol timing offset using a plurality of time-domain samples belonging to two or more OFDM symbols.

74. The system of claim 61 wherein the estimator means is operative to minimize an average cost function associated with the selected symbol timing estimation mode.

75. The system of claim 74, wherein the estimator means comprises means for solving the equation:

$$\hat{\theta} = \arg\min_{0 \le k \le N_t} \left\{ \sum_{O=0}^{N_t-1} c(k - \theta) e^{\beta[Re\{\gamma(\theta)\} - \rho\Phi(\theta)] - \Psi(\theta)} \right\},$$

with an error function $$c(\epsilon) = [\min\{((\epsilon))_{N_t}, N_t - ((\epsilon))_{N_t}\}]^2,$$

and
where $\hat{\theta}$ is the symbol timing offset estimate,
$N_t$ is the total number of samples in the symbol,
$N_g$ is the number of samples in a cyclic prefix in the symbol, $$N = N_t - N_g,$$

$$\beta = \frac{2\rho}{(\sigma_X^2 + \sigma_Z^2)(1 - \rho^2)},$$

$$\rho = \frac{\sigma_X^2}{(\sigma_X^2 + \sigma_Z^2)},$$

$$\gamma(\theta) = \sum_{n \in A_\theta \cap I} y[n] y*[n + N],$$

$$\Phi(\theta) = \frac{1}{2} \sum_{n \in A_\theta \cap I} (|y[n]|^2 - |y[n + N]|^2),$$

$$\Psi(\theta) = |A_\theta \cap I| \log(1 - \rho^2),$$

$$I = \{0, 1, \ldots, M-N-1\},$$

$$A_\theta = \bigcup_{i=-\infty}^{\infty} \{\theta + iN_t, \ldots, (\theta + N_g - 1) + iN_t\},$$

y[n] is a received sample with index n,
$\sigma_X^2$ is a transmit signal power,
$\sigma_Z^2$ is a noise power, and
M is the size of an observation window.

\* \* \* \* \*